(12) United States Patent
Riley (10) Patent No.: US 8,781,936 B2
(45) Date of Patent: Jul. 15, 2014

(54) FINANCIAL DATA ENTRY SYSTEM

(76) Inventor: Charles A. Riley, Wilmington, NC (US)

( * ) Notice: Subject to any disclaimer, the term of this patent is extended or adjusted under 35 U.S.C. 154(b) by 576 days.

(21) Appl. No.: 12/720,240

(22) Filed: Mar. 9, 2010

(65) Prior Publication Data

US 2010/0161514 A1   Jun. 24, 2010

Related U.S. Application Data

(63) Continuation of application No. 11/611,380, filed on Dec. 15, 2006, now abandoned.

(60) Provisional application No. 60/597,652, filed on Dec. 15, 2005.

(51) Int. Cl.
*G06Q 40/00* (2012.01)

(52) U.S. Cl.
USPC ...................................................... 705/36 R

(58) Field of Classification Search
USPC .................. 705/36 R, 1, 35; 707/3; 703/1
See application file for complete search history.

(56) References Cited

U.S. PATENT DOCUMENTS

| | | | | |
|---|---|---|---|---|
| 4,445,711 | A * | 5/1984 | Cunningham | 283/117 |
| 5,910,903 | A * | 6/1999 | Feinberg et al. | 703/6 |
| 5,991,744 | A * | 11/1999 | DiCresce | 705/36 R |
| 7,139,744 | B2 * | 11/2006 | Tran et al. | 1/1 |
| 7,337,142 | B1 * | 2/2008 | Holmes et al. | 705/39 |
| 7,444,301 | B2 * | 10/2008 | Conklin et al. | 705/37 |
| 2002/0091621 | A1 * | 7/2002 | Conklin et al. | 705/37 |
| 2002/0156638 | A1 * | 10/2002 | Guedri et al. | 705/1 |
| 2005/0007624 | A1 * | 1/2005 | Henry | 358/1.15 |
| 2005/0038726 | A1 * | 2/2005 | Salomon et al. | 705/36 |
| 2005/0285733 | A1 * | 12/2005 | Gualdi et al. | 340/539.13 |
| 2006/0053062 | A1 * | 3/2006 | Park | 705/26 |

* cited by examiner

*Primary Examiner* — Kelly Campen
(74) *Attorney, Agent, or Firm* — Oliff PLC (57) ABSTRACT

A method of tracking and aggregating all Securities and Exchange Commission (SEC) "shelf" registration and all capital market activity related to those shelf registrations. The method includes the steps of accessing a first database containing data associated with investment registrations, wherein the data is organized as a series of individual filings. The method further includes the steps of retrieving data from the first database associated with selected ones of the filings, organizing the data into tables based on at least one aggregate aspect of the data common to multiple filings, and storing the retrieved data in at least one table.

20 Claims, 10 Drawing Sheets

FIG. 1

LOGIN

User Login
Please enter your username and password below.

Username:
Password:
[LOG IN]

FIG. 2

Logout

Please Choose which deal type you would like to enter:

Add Deal  Shelf Filing  Equity  Convertable  Fixed Income

Edit Deal  Select Deal

Done

FIG. 3

/Entry-Select Deal.htm/
Select Deal

| Issuer ▷ | Equal To ▷ | | Submit |

| Issuer Name | Deal Type | Filing Date |
|---|---|---|
| General Electric | EQUITY | 1/1/2005 |
| Microsoft | CONVERTIBLE | 3/2/2002 |
| General Motors | FIXED INCOME | 8/2/2005 |
| HSBC | EQUITY | 11/3/2001 |

Views: Page, Folders, Reports, Navigation, Hyperlinks, Tasks

FIG. 4

Shelf Filing

| Issuer Information | Select Issuer |
|---|---|
| Issuer Name: | |
| Ticker: | |
| Website: | Exchange: |
| SIC Code: | |
| Sector: | |
| Industry: | |
| Nationality: | Edit Issuer |

Shelf Information

Link 1: ______  Link 2: ______  Link 3: ______
Filing Form: [S-1 ▾]  Filing Date: ______
Rule 415: [Yes ▾]  Rule 462: [Yes ▾]  Rule 429: [Yes ▾]
Security Class:

Value
Value: ______  Primary Value: ______
Revised Value: ______  Secondary Value: ______

Equity Value: ______
Debt Value: ______
Other Value: ______

Shares:
Primary Shares: ______  Secondary Shares: ______
Last Trade before filing: ______
Purpose: [S-10 ▾]  Type: [S-10 ▾]
Note: ______  Use of Proceeds: ______
Shareholders Equity: ______  Long Term Debt: ______
Takedown: [Yes ▾]  Price At Offer: ______

Stock

Common Stock:  Restricted Stock:
Authorized: ______  Authorized: ______
Outstanding: ______  Outstanding: ______
Issued: ______  Issued: ______

Performed Stock  Units
Authorized: ______  Authorized: ______
Outstanding: ______  Outstanding: ______
Issued: ______  Issued: ______

Selling Shareholders

Morgan Stanley  Remove
Goldman Sachs  Remove
CSFB  Remove
Add Selling Shareholder

[Save] [Save & Return To Main Menu] [Delete] [Cancel]

Equity Takedown

| Shelf    Select Shelf |
|---|
| Issuer Name:<br>Ticker:          Exchange<br>Filing Date:<br>Value<br>Value:          Primary Value:<br>Equity Value:     Secondary Value:<br>Debt Value:<br>Other Value: |

| Equity Takedown Information | | |
|---|---|---|
| Link 1: ▭ | Link 1 Filing Form: [424B ▾] | Link 1 Filing Date: ▭ |
| Link 2: ▭ | Link 2 Filing Form: [424B ▾] | Link 2 Filing Date: ▭ |
| Link 3: ▭ | Link 3 Filing Form: [424B ▾] | Link 3 Filing Date: ▭ |
| Link 4: ▭ | Link 4 Filing Form: [424B ▾] | Link 4 Filing Date: ▭ |
| Link 5: ▭ | Link 5 Filing Form: [424B ▾] | Link 5 Filing Date: ▭ |
| Link 6: ▭ | Link 6 Filing Form: [424B ▾] | Link 6 Filing Date: ▭ |

Filing Form: [424B ▾]           Filing Date: ▭

Lock Up (Days): ▭
Class Of Security: ▭
Total Debt: ▭
Note: ▭

Shares
Registered Shares: ▭      Primary Shares: ▭       Outstanding Shares: ▭
Issued Shares: ▭          Secondary Shares: ▭     Outstanding Shares ▭
Overallotment                                      w/ TD
Authorized: ▭             Pricing Date: ▭         Shares Issued: ▭

Gross Spread
Per Share: ▭              Total: ▭

Proceeds
Per Share: ▭              Total: ▭
Use: ▭

Last Trade Before File: ▭    Last Trade Before Price: ▭
Price: ▭                     Pricing Date: ▭

| Underwriters | | |
|---|---|---|
| Bank | Role | |
| Morgan Stanley | Bookrunner | Remove |
| Goldman Sachs | Bookrunner | Remove |
| CSFB | Co-Manager | Remove |
| Add Bank | | |

[Save] [Save & Return To Main Menu] [Delete Deal] [Cancel]

FIG. 8

Convertible Takedown

| Shelf   Select Shelf |
| --- |
| Issuer Name: |
| Ticker:              Exchange |
| Filing Date: |
| Value |
| Value:              Primary Value: |
| Equity Value:         Secondary Value: |
| Debt Value: |
| Other Value: |

Convertible Takedown Information

Link 1: ▭     Link 2: ▭     Link 3: ▭
Filing Date: ▭     Pricing Date: ▭

Class Of Security: ▭
Coupon: ▭     Maturity: ▭
Value: ▭
Call Protection: ▭
Premium: ▭

Securities
Shares Registered: ▭     Block Trade: [Yes ▾]
Shares Issued: ▭     Converts To: ▭
Shares Outstanding: ▭     Rating: ▭
Overallotment
Authorized: ▭     Shared Issues: ▭
Price: ▭     Pricing Date: ▭
Gross Spread
Per Share: ▭     Total: ▭
Proceeds
Per Share: ▭     Total: ▭
Use: ▭
Price: ▭     Price At File: ▭     Price At Offer: ▭

| Selling Shareholders: | |
| --- | --- |
| Morgan Stanley | Remove |
| Goldman Sachs | Remove |
| CSFB | Remove |
| Add Selling Shareholder | |

| Underwriters | | |
| --- | --- | --- |
| Bank | Role | |
| Morgan Stanley | Bookrunner | Remove |
| Goldman Sachs | Bookrunner | Remove |
| CSFB | Co-Manager | Remove |
| Add Bank | | |

[Save] [Save & Return To Main Menu] [Delete Deal] [Cancel]

FIG. 9

FIXED INCOME TAKEDOWN

| Shelf  Select Shelf |
|---|
| Issuer Name: |
| Ticker:                Exchange |
| Filing Date: |
| Value |
| Value:                Primary Value: |
| Equity Value:         Secondary Value: |
| Debt Value: |
| Other Value: |

Fixed Income Takedown information

Link 1: ☐     Link 2: ☐     Link 3: ☐
Filing Date: ☐     Pricing Date: ☐
Pricing Supplimental Date: ☐     Settlement Date: ☐

Price: ☐
Value: ☐     Offering Value w/OA: ☐
Total Unsecured & ☐     Total Senior & Secured: ☐
Unsubordinated:
Class Of Security: ☐     Interest Calculation Type: Fixed ▼
Coupon: ☐
Call Protection: ☐     Maturity: ☐
Premium: ☐
Note: ☐
Securities
Shares Registered: ☐     Block Trade: Yes ▼
Issued: ☐     Rating: ☐
Shares Issued w/ OA: ☐
Shares Outstanding: ☐
Gross Spread
Per Share: ☐     Total: ☐
Proceeds
Per Share: ☐     Total: ☐
Use: ☐

Last Trade Before Issuance: ☐     Price At File: ☐     Price At Offer: ☐
Total Debt: ☐

| Selling Shareholders: | |
|---|---|
| Morgan Stanley | Remove |
| Goldman Sachs | Remove |
| CSFB | Remove |
| Add Selling Shareholder | |

| Underwriters | | |
|---|---|---|
| Bank | Role | |
| Morgan Stanley | Bookrunner | Remove |
| Goldman Sachs | Bookrunner | Remove |
| CSFB | Co-Manager | Remove |
| Add Bank | | |

[ Save ] [ Save & Return To Main Menu ]  [ Delete Deal ] [ Cancel ]

FIG. 10

FINANCIAL DATA ENTRY SYSTEM

CROSS-REFERENCE TO RELATED APPLICATIONS

This application is a continuation of U.S. non-provisional patent application Ser. No. 11/611,380, filed on Dec. 15, 2006, and entitled "Financial Data Entry System." This application and the Ser. No. 11/611,380 application claim the benefit of the priority of Provisional Application No. 60/597,652, filed on Dec. 15, 2005.

TECHNICAL FIELD AND BACKGROUND OF THE INVENTION

The present invention relates to the field of computer databases. In particular, the invention relates to a software interface and database that tracks and aggregates all Securities and Exchange Commission (SEC) "shelf" registration and all capital market activity related to those shelf registrations.

Shelf registration refers to the registration of securities, under SEC rule 415, that are not to be presently offered for sale. SEC rule 415 allows issuers to register securities (such as Equity, Fixed Income, and Universal) for an offering to be made on a continuous or delayed basis. That is, the securities are being registered so they can be placed "on the shelf" until the time comes for issuance. The shelf registrations may be primary or secondary or both.

Issuers use a two year window to speculate on capital markets activity, and to determine the types of securities that the issuers will use during this time to raise capital. Issuers that qualify as well-known seasoned issuers (wksi) file an unlimited shelf every three years to raise capital. Shelf registrations allow corporations to defer the sale of securities after registration until funds are needed or market conditions are favorable. Although, shelf registration permits a corporation to place the sell of shares on standby, it must still file the required annual and quarterly reports to the SEC.

Capital market activity relative to the shelf is called a "takedown." Takedown is a term that refers to underwriters taking securities off the shelf. For example, a company files a five billion dollar shelf and later decides to sell one billion dollars worth of investment grade bonds. In this case, an underwriter has performed a one billion dollar shelf takedown and has left four billion dollars remaining on the shelf.

Shelf registrations and takedowns are a common occurrence in the market place, and represent a substantial portion of capital markets activity. It is important for bankers to keep track of shelf registrations and takedowns so that they know the value and or the types of securities available for issuance. For the investment banking divisions of banks, keeping track of shelf registrations and takedowns is a very difficult and time consuming undertaking. Couple this with analyzing the company's stock performance relative to this activity and a considerable outlay of resources is required.

Accordingly, there is a need for a software and database system that can populate a database table with the appropriate data to be used in an application tracking and analyzing these financial transactions.

SUMMARY OF THE INVENTION

Therefore it is an object of the invention to provide a software and database system that tracks and aggregates all SEC shelf registrations.

It is another object of the invention to provide a software and database system that tracks and aggregates all capital market activity related to an SEC shelf registration.

It is another object of the invention to provide a software and database system that tracks and aggregates all issuers and subsidiaries related to an SEC shelf registration.

It is another object of the invention to provide a software and database system that tracks all selling shareholders who register shares under these shelf offerings.

It is another object of the invention to provide a software and database system that tracks stock performance relative to capital markets activity.

These and other objects of the present invention are achieved in the preferred embodiments disclosed below by providing a method of tracking investment registrations including the steps of accessing a first database containing data associated with investment registrations, wherein the data is organized as a series of individual filings. The method further including retrieving data from the first database associated with selected ones of the filings, organizing the data into tables based on at least one aggregate aspect of the data common to multiple filings, and storing the retrieved data in at least one table.

According to another preferred embodiment of the invention, the step of retrieving data includes the step of searching by a company ticker.

According to another preferred embodiment of the invention, the step of retrieving data includes the step of searching by an issuer name.

According to another preferred embodiment of the invention, the method further includes the step of linking parent companies to their respective subordinate companies.

According to another preferred embodiment of the invention, the method further includes the step of tracking common stock associated with the filings.

According to another preferred embodiment of the invention, the method further includes the step of tracking a performance of the common stock.

According to another preferred embodiment of the invention, the method further includes the step of tracking a takedown relative to the filings.

According to another preferred embodiment of the invention, the method further includes the step of subtracting a respective takedown from a corresponding linked shelf filing.

According to another preferred embodiment of the invention, the method further includes the step of updating the data.

According to another preferred embodiment of the invention, the method further includes the step of updating the data when a takedown relative to the filings has occurred.

According to another preferred embodiment of the invention, the method further includes the step of automatically updating the data.

According to another preferred embodiment of the invention, the method further includes the step of searching a data entry system for previously downloaded data relating to a respective shelf filing.

According to another preferred embodiment of the invention, the method further includes the step of updating the data by searching for market activity relating to the shelf filing and downloading the data into the data entry system.

According to another preferred embodiment of the invention, the method further includes the step of generating a report in a format suitable for investment banking.

According to another preferred embodiment of the invention, a computer implemented system for tracking investment registrations includes an accessing means for accessing a first database containing data associated with investment registrations, wherein the data is organized as a series of individual filings; a retrieving means for retrieving data from the first database associated with selected ones of the filings; an organizing means for organizing the data into tables based on at least one aggregate aspect of the data common to multiple filings; and a storing means for storing the retrieved data in at least one table.

According to another preferred embodiment of the invention, a computer readable medium is provided that includes software for tracking investment registrations. The software includes instructions for accessing a first database containing data associated with investment registrations, wherein the data is organized as a series of individual filings. The software further includes instructions for retrieving data from the first database associated with selected ones of the filings; organizing the data into tables based on at least one aggregate aspect of the data common to multiple filings; and storing the retrieved data in at least one table.

According to another preferred embodiment of the invention, the software further includes instructions for tracking performance of common stock associated with the filings.

According to another preferred embodiment of the invention, the software further includes instructions for linking parent companies to their respective subordinate companies.

According to another preferred embodiment of the invention, the software further includes instructions for tracking a takedown relative to the filings.

According to another preferred embodiment of the invention, the software further includes instructions for subtracting the takedown from a corresponding linked filing.

According to another preferred embodiment of the invention, the software further includes instructions for updating the data in the tables in response to the takedown.

According to another preferred embodiment of the invention, the software further includes instructions for retrieving data associated with previously retrieved data relating to a respective one of the filings.

According to another preferred embodiment of the invention, the software further includes instructions for monitoring market activity relating to the filings.

BRIEF DESCRIPTION OF THE DRAWINGS

The invention may be best understood by reference to the following description in conjunction with the accompanying drawing figures in which.

DESCRIPTION OF THE PREFERRED EMBODIMENT AND BEST MODE

Figure 1:
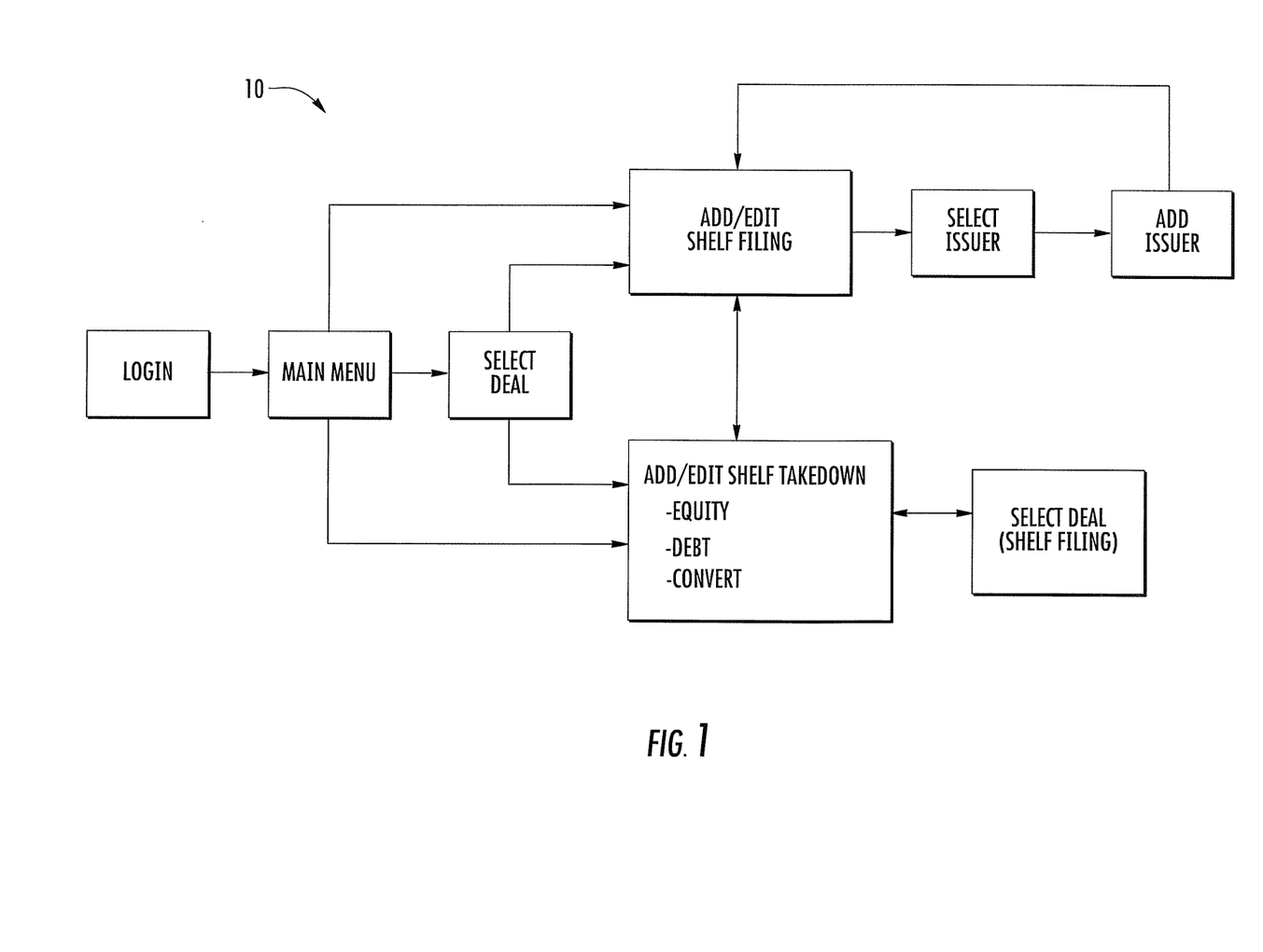
FIG. 1 is a flow diagram according to an embodiment of the invention.

Referring now specifically to the drawings, a software and database system according to an embodiment of the invention is illustrated in FIG. 1 and shown generally at reference numeral 10.

The system uses a class 3 tier system with an application service provider (ASP) front end, C# business logic, and a structured query language (SQL) server 2000 back end. The ASP is used to capture and present data, while all data manipulations and error checking are done in C#. Other suitable programming packages may also be used.

The system 10 provides the ability to search by ticker or issuer name and track all shelf registrations. It also stores data points per filing and per deal into a structured database, provides tools for analyzing data and creating reports, links parent companies to all subordinate companies, provides breakdown and roll up of parent-child shelf registrations, aggregates data into formats conducive to prospecting for investment banking, tracks common stock and common stock versus S&P 500 Index performance relative to shelf takedowns to help analyze the effects of capital placement, and provides tools so that customers can map issuers to their own custom sector and industry groups.

In use, the system 10 provides a user with various screens to guide the user through the system 10. First, the user is presented with a login screen, shown in FIG. 2, to allow the user to login to the system 10. Once the username and password have been entered and the login button has been clicked, the username and password is checked against a USERS table, such as the one shown below in Table 1.

TABLE 1

Owner:
Target DB name:
Number of columns: 5
Number of indexes: 0
Number of foreign keys: 0

| Columns | Data type | Allow NULLs | Value/Range |
| --- | --- | --- | --- |
| UserID | int identity | Not allowed | |
| Name | varchar(200) | Not allowed | |
| Email | varchar(200) | Allowed | |
| Password | varchar(200) | Not allowed | |
| Service_Level | varchar(200) | Not allowed | |

Figure 2:
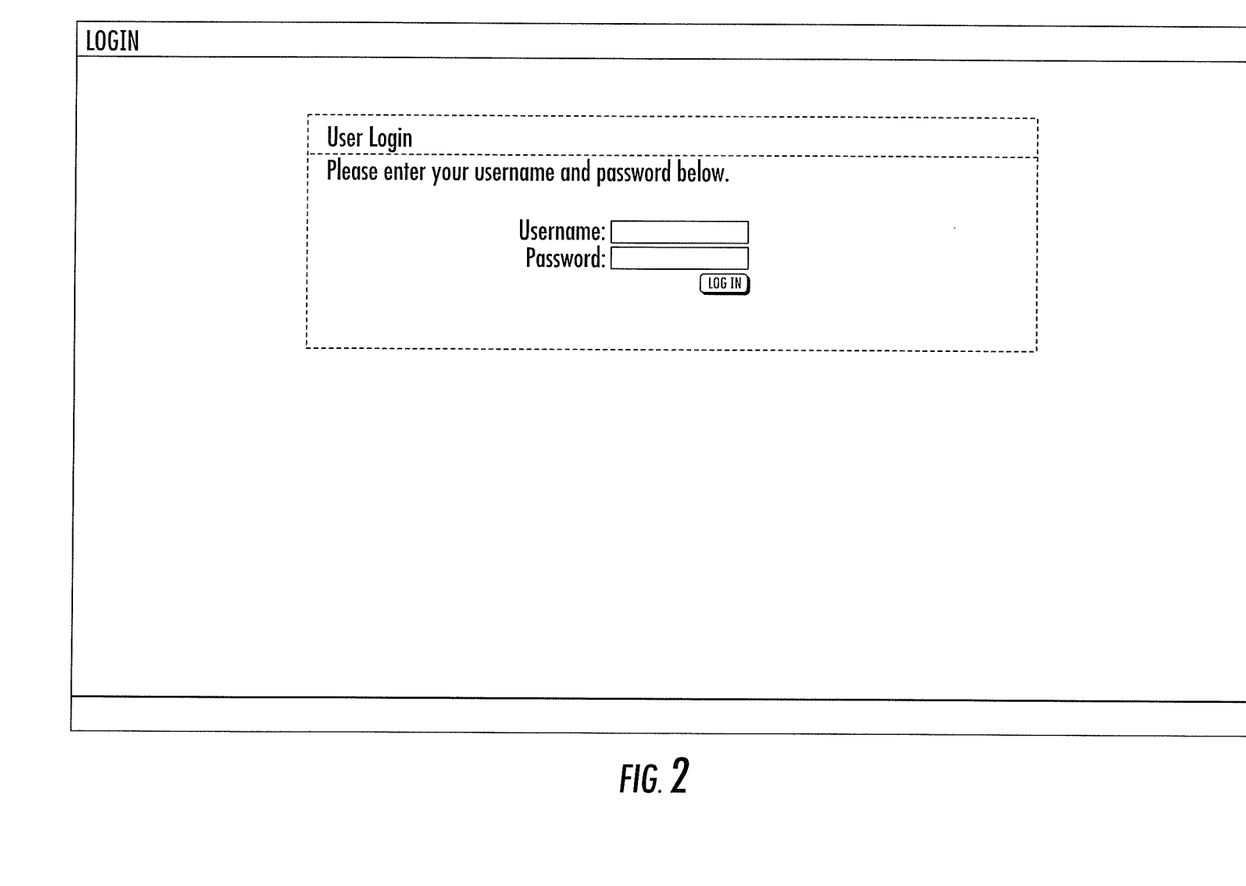
FIG. 2 is a login screen image.

If their USERS.Service=ADMIN, then they are forwarded on to the main menu and a session is started. If their USERS.Service does not equal ADMIN then they are returned to the login page.

Figure 3:
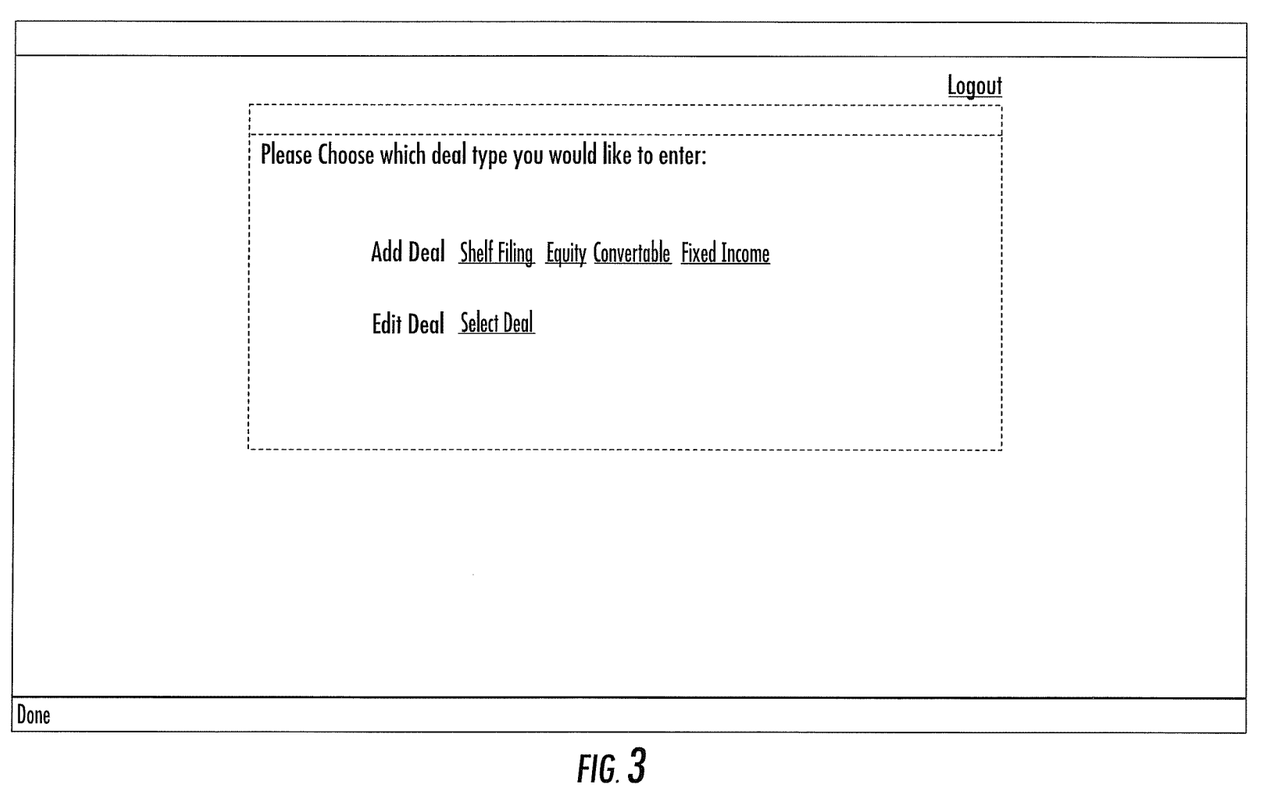
FIG. 3 is a main menu screen image.

Once the user has logged into the system 10, the user is presented with a main menu screen, as shown in FIG. 3. The main menu allows the user to add, edit, or delete all four types of deals (shelf, equity, debt, and convertible) through the use of hyperlinks. If the user wants to edit or delete a deal, the user clicks on the "Select Deal" hyperlink. If the user wants to add a deal, the user clicks on the hyperlink related to the type of deal being entered.

Figure 4:
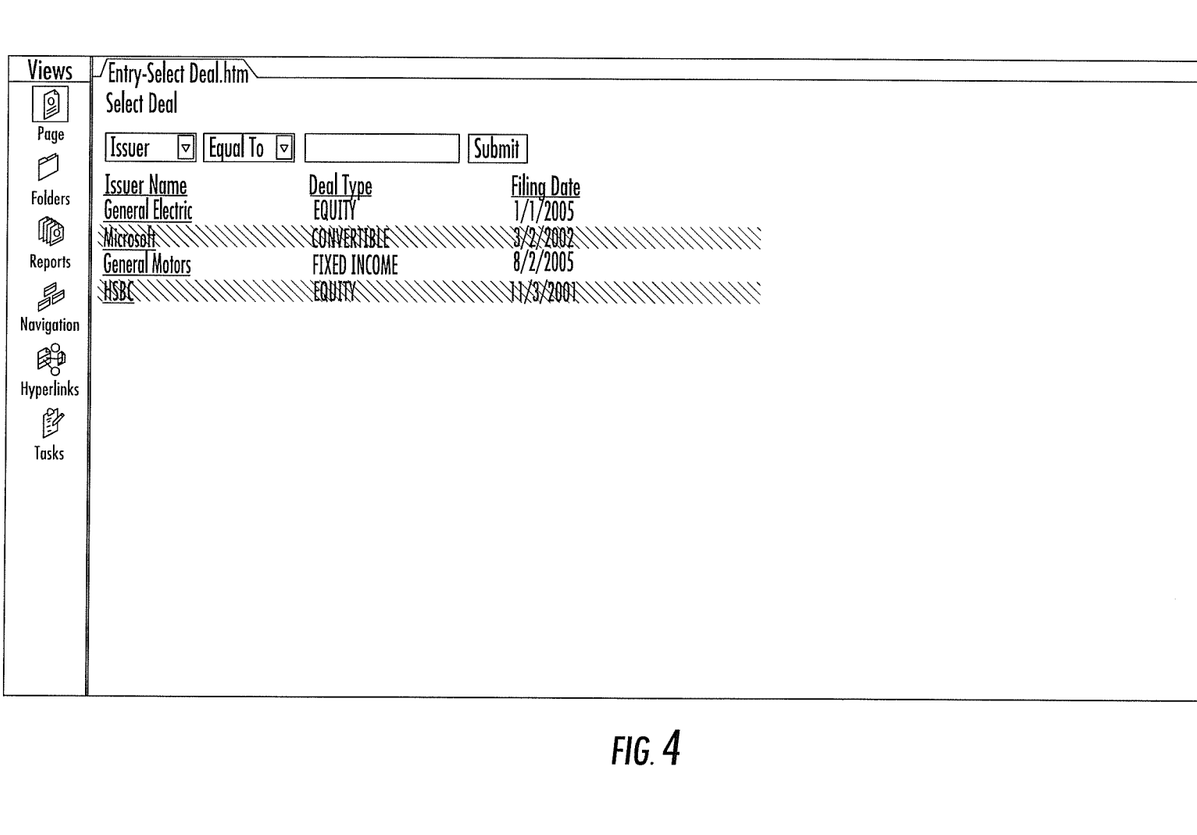
FIG. 4 is a select deal screen image.

If the user selects the Select Deal hyperlink on the main menu, a popup screen, shown in FIG. 4, appears. The popup screen allows the user to select a deal then edit it. The popup screen will initially have no deals listed when loaded. Pull down menus are used to accept arguments to restrict the list and to further cut down the number of deals shown on the screen. Possible arguments include SHELF, EQUITY, FIXED INCOME, and CONVERTIBLE. Other drop down options include "Issuer Name" and "Filing Date." Another pull down menu allows the user to select EQUALS, CONTAINS, GREATER THAN, and LESS THAN. Once the drop down menus have been selected and the submit button has been clicked, an SQL server search is run. The SQL server statement querying the deal will be modified depending on the arguments passed to it and the drop down menus. Once a deal number has been selected by clicking on the issuer name, the popup will close and the main window will then be forwarded to the correct "Add/Edit" screen with the deal number added as an argument.

If the user selects one of the "Add Deal" hyperlinks (Shelf Filing, Equity, Convertible, and Fixed Income), the user is directed to the correct Add/Edit screen for the respective deal type selected. For example, if the user selects the "Shelf Filing" hyperlink, the user is directed to an Add/Edit screen for Shelf Filing. When adding a deal, the user searches the SEC's Electronic Data Gathering, Analysis, and Retrieval system (EDGAR) for company filings. Once the desired filing is located, the data associated with that filing, including data from associated filings, is pulled into the system. This data is continually updated.

Figure 5:
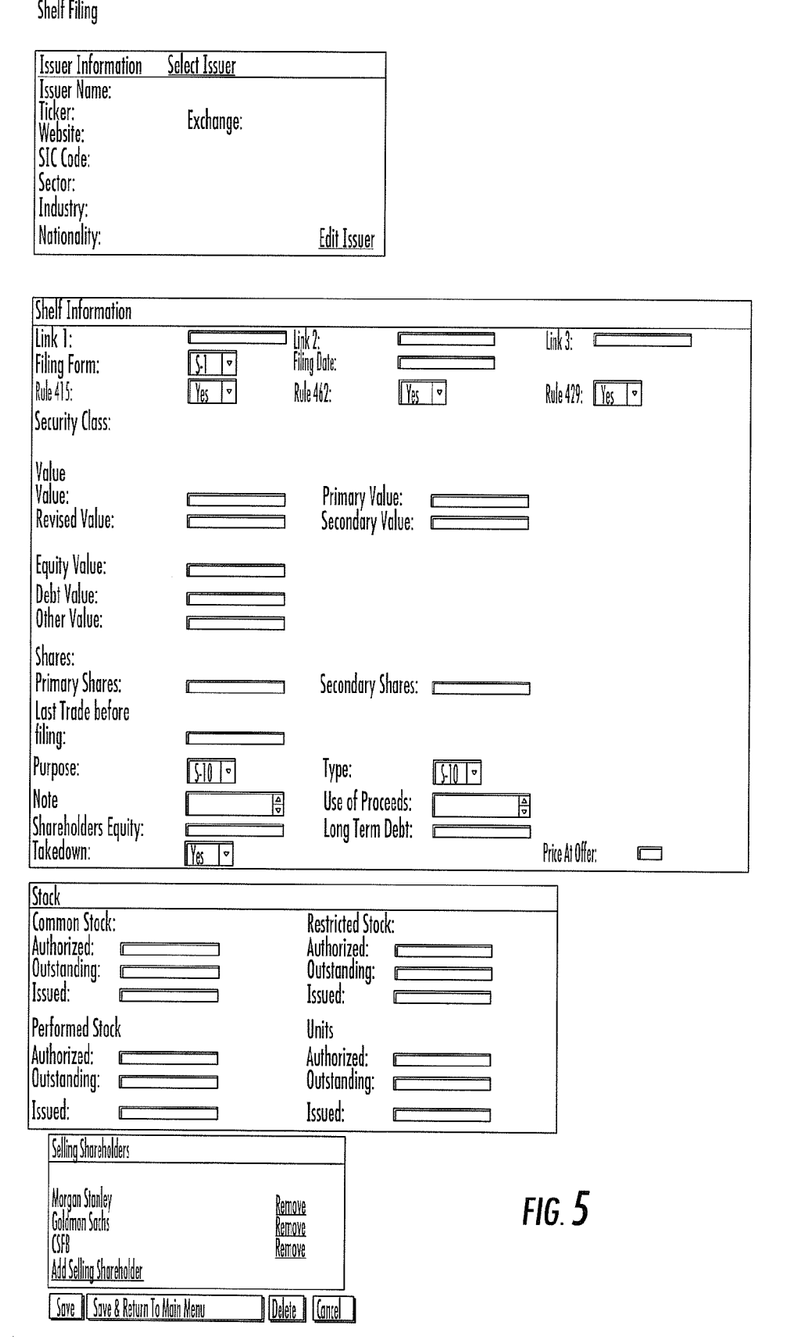
FIG. 5 is a shelf filing screen image.

If the Shelf Filing hyperlink is selected, the Add/Edit screen, shown in FIG. 5, is presented. The Shelf Filing screen allows the user to add, edit, or delete a shelf filing. The screen is capable of using the deal number provided by the Select Deal popup screen as an argument. If a deal number is provided, the deal information is prepopulated. If a deal number is not provided, the user can populate the table using other links, such as "Select Issuer" and "Add Selling Shareholder."

Figure 6:
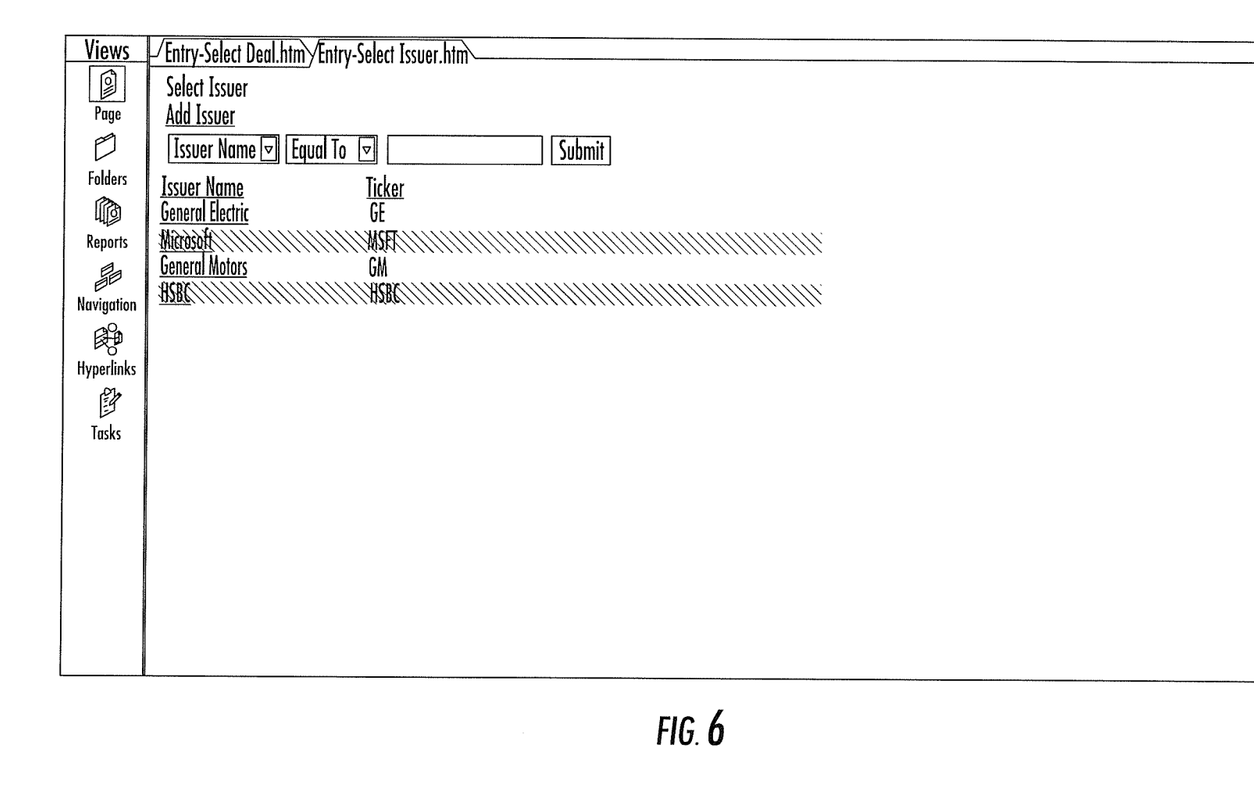
FIG. 6 is a select issuer screen image.

If the Select Issuer hyperlink is selected, a Select Issuer popup screen appears, shown in FIG. 6. The Select Issuer screen is used to populate issuer information for each deal. The Select Issuer screen performs an SQL server search using an issuers table like the one shown below in Table 2.

Drop down menus allow the user to restrict the search. The first drop down menu includes the options of "Issuer Name" and "Ticker." The second drop down menu options are EQUALS and CONTAINS. When an issuer is selected, the window will close the main Shelf Filing screen will populate with that issuer.

Figure 7:
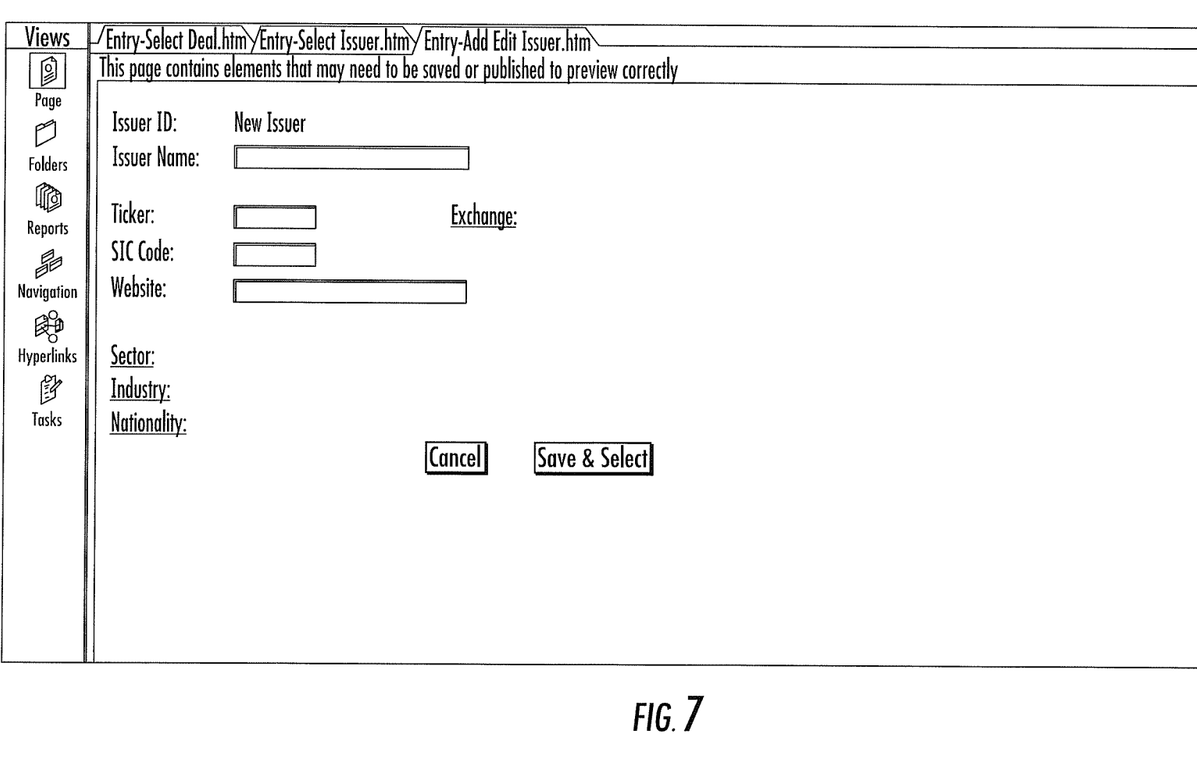
FIG. 7 is an add/edit issuer screen image.

If the user is not able to find the issuer they are looking for, they can click the "Add Issuer" link and it will forward them to the Add/Edit Issuer screen, shown in FIG. 7, with no arguments passed to it. The Add/Edit Issuer screen allows the user to add/edit an issuer. If the screen is loaded with an Issuer ID passed to it, then all of the information will be prepopulated. If the screen is called with no arguments, then the user will have to add the issuer. In this case, the screen will be empty and issuer ID will have a non-editable "New Issuer" tag. When the Save and Select button is selected, the user is returned to the Shelf Filing screen with this issuer selected.

The Shelf Filing screen also allows underwriter information to be added by selecting the "Add Selling Shareholder" link or deleted by selecting the remove link. Once a deal has been selected, specific checks are made against the data after it is entered to make sure it is in the correct format. Any error messages may be provided in red at the top of the screen, listing everything that is incorrect before the deal can be saved or updated in a shelf database like the one shown below in Table 3.

TABLE 2

Owner:
Target DB name:
Number of columns: 9
Number of indexes: 0
Number of foreign keys: 5

| Columns | Data type | Allow NULLs | Value/Range |
|---|---|---|---|
| IssuerID | int identity | Not allowed | |
| Issuer_Name | varchar(200) | Not allowed | |
| Website | varchar(200) | Allowed | |
| SIC_Code (FK) | int | Allowed | |
| ExchangeID (FK) | int | Allowed | |
| Ticker | varchar(20) | Allowed | |
| NationalityID (FK) | int | Allowed | |
| SectorID (FK) | int | Allowed | |
| IndustryID (FK) | int | Allowed | |

| Foreign keys | Child | Parent |
|---|---|---|
| tbl_SIC_tbl_Issuer_FK1 | SIC_Code | tbl_SIC.SIC_code |
| tbl_Exchange_tbl_Issuer_FK1 | ExchangeID | tbl_Exchange.ExchangeID |
| tbl_Nationality_tbl_Issuer_FK1 | NationalityID | tbl_Nationality.NationalityID |
| tbl_Industry_tbl_Issuer_FK1 | IndustryID | tbl_Industry.IndustryID |
| tbl_Sector_tbl_Issuer_FK1 | SectorID | tbl_Sector.SectorID |
| tbl_Issuer_tbl_SHELF_FK1 | tbl_SHELF.IssuerID | IssuerID |
| tbl_Issuer_tbl_EQUITY_FK1 | tbl_EQUITY.IssuerID | IssuerID |
| tbl_Issuer_tbl_CONVERTIBLE_FK1 | tbl_CONVERTIBLE.IssuerID | IssuerID |
| tbl_Issuer_tbl_FIXEDINCOME_FK1 | tbl_FIXEDINCOME.IssuerID | IssuerID |

TABLE 3

Owner:
Target DB name:
Number of columns: 40
Number of indexes: 0
Number of foreign keys: 1

| Columns | Data type | Allow NULLs | Value/Range |
| --- | --- | --- | --- |
| Deal | int | Not allowed | |
| IssuerID (FK) | int | Not allowed | |
| Link_1 | varchar(200) | Allowed | |
| Link_2 | varchar(200) | Allowed | |
| Link_3 | varchar(200) | Allowed | |
| Filing_Form | varchar(20) | Allowed | |
| Filing_Date | datetime | Allowed | |
| Rule_415_YN | varchar(1) | Allowed | |
| Rule_462_YN | varchar(1) | Allowed | |
| Rule_429_YN | varchar(1) | Allowed | |
| Security_Class | varchar(20) | Allowed | |
| Value | decimal(12, 2) | Allowed | |
| Equity_Value | decimal(12, 2) | Allowed | |
| Debt_Value | decimal(12, 2) | Allowed | |
| Other_Value | decimal(12, 2) | Allowed | |
| Primary_Value | decimal(12, 2) | Allowed | |
| Secondary_Value | decimal(12, 2) | Allowed | |
| Primary_Shares | int | Allowed | |
| Secondary_Shares | int | Allowed | |
| Last_Trade_before_file | decimal(12, 3) | Allowed | |
| Purpose | varchar(50) | Allowed | |
| Type | varchar(50) | Allowed | |
| Shelf_Note | varchar(1000) | Allowed | |
| Use_Proceeds | varchar(1000) | Allowed | |
| LT_Debt | decimal(15, 3) | Allowed | |
| Common_Stock_Authorized | int | Allowed | |
| Common_Stock_Outstanding | int | Allowed | |
| Common_Stock_Issued | int | Allowed | |
| Preferred_Stock_Authorized | int | Allowed | |
| Preferred_Stock_Outstanding | int | Allowed | |
| Preferred_Stock_Issued | int | Allowed | |
| Restricted_Stock_Authorized | int | Allowed | |
| Restricted_Stock_Outstanding | int | Allowed | |
| Restricted_Stock_Issued | int | Allowed | |
| Shareholders_Equity | decimal(15, 3) | Allowed | |
| Stock_Units_Authorized | int | Allowed | |
| Stock_Units_Outstanding | int | Allowed | |
| Stock_Units_Issued | int | Allowed | |
| Takedown_YN | varchar(1) | Allowed | |
| Revised_Value | decimal(12, 2) | Allowed | |

| Foreign keys | Child | Parent |
| --- | --- | --- |
| tbl_Issuer_tbl_SHELF_FK1 | IssuerID | tbl_Issuer.IssuerID |

Figure 8:
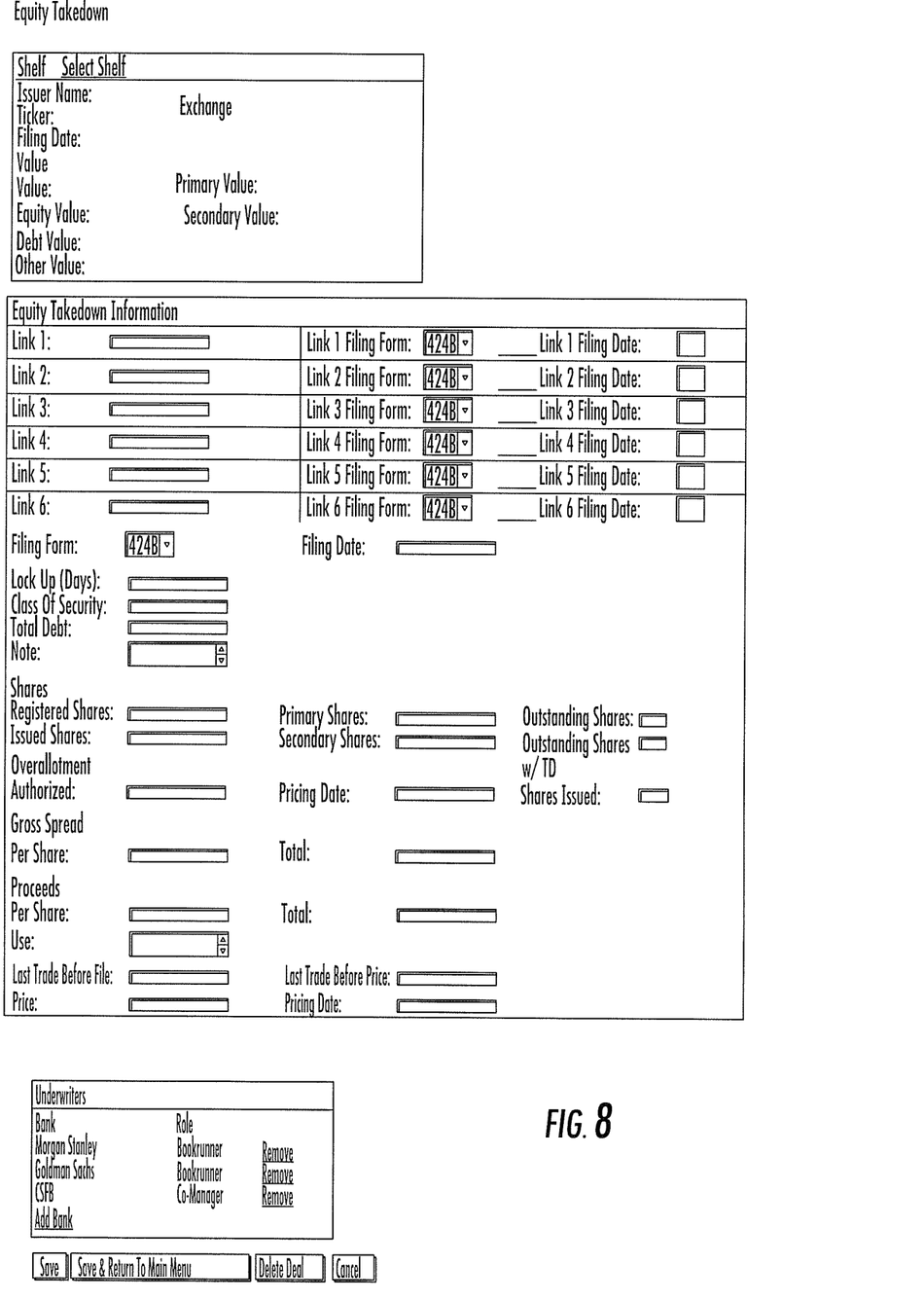
FIG. 8 is an equity takedown screen image.
Figure 9:
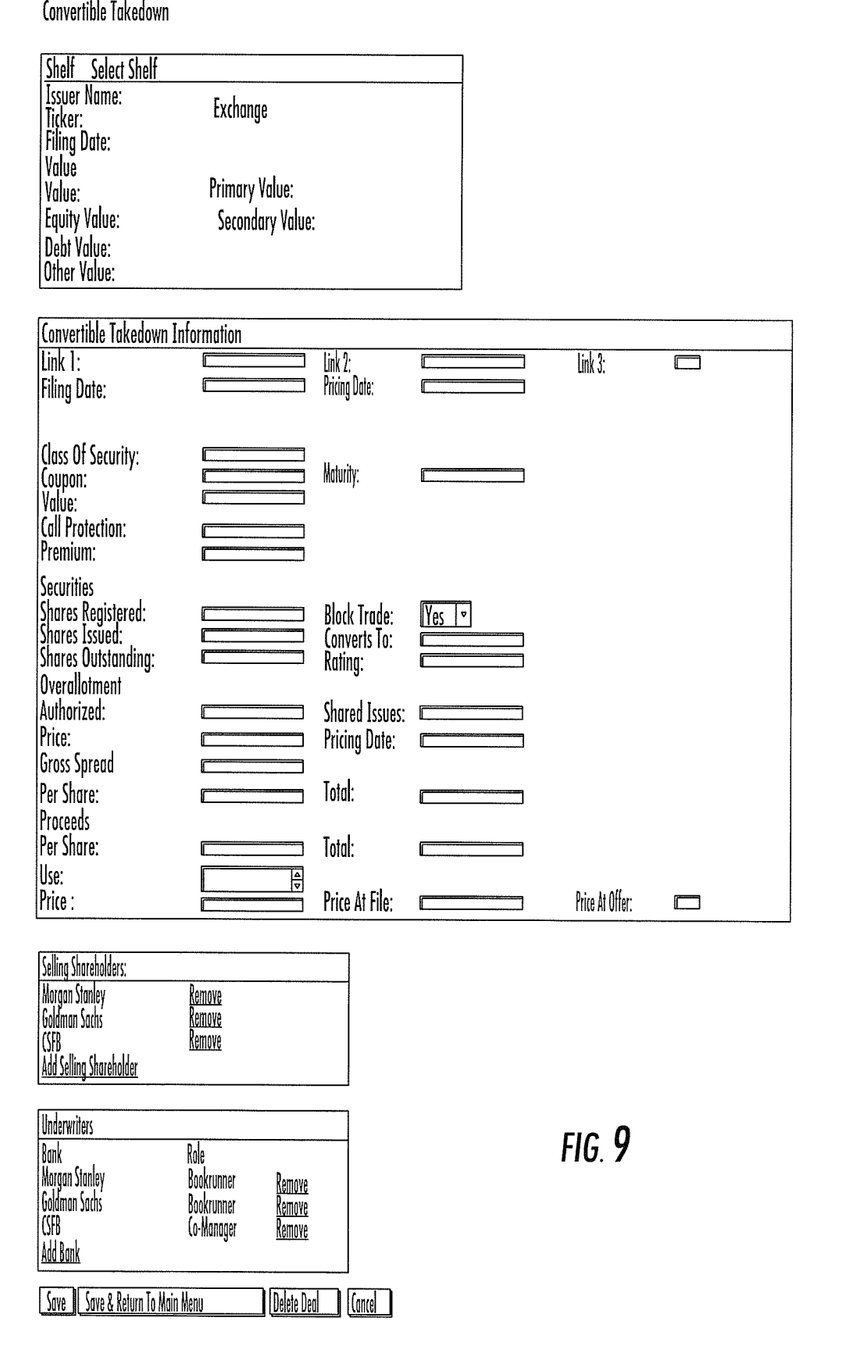
FIG. 9 is a convertible takedown screen image.
Figure 10:
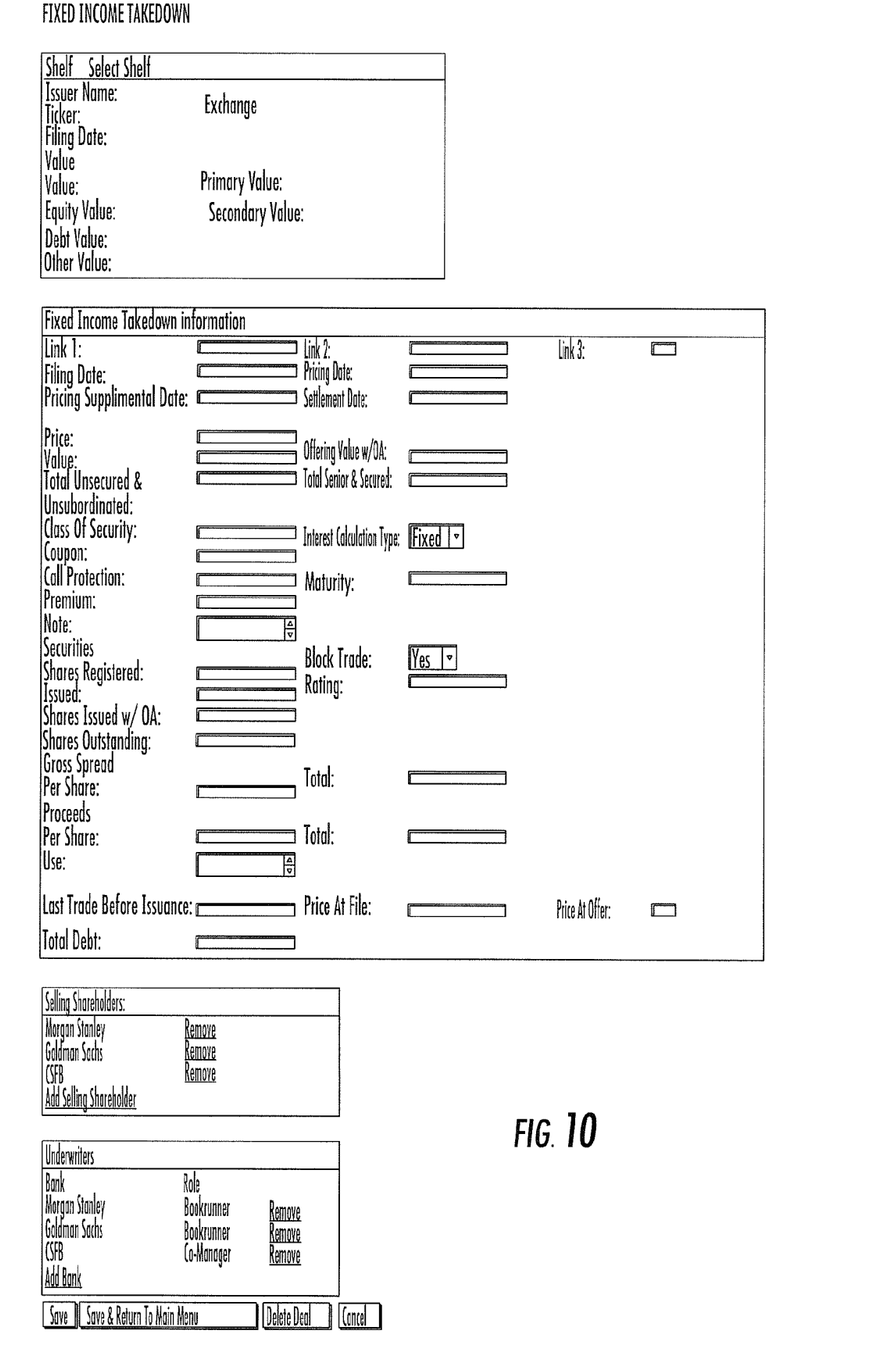
FIG. 10 is a fixed income takedown screen image.

If the Equity, Convertible, or Fixed Income hyperlink is selected, an Add/Edit screen for the selected link is presented. FIGS. 8, 9, and 10 are representative of screens related to the hyperlinks. Like the Shelf Filing screen, the Equity, Convertible, and Fixed Income screens are capable of using the deal number provided by the Select Deal popup screen as an argument. If a deal number is provided, the deal information is prepopulated. If a deal number is not provided, the user can populate the table using other links. The Equity, Convertible, and Fixed Income screens operate in the same manner, thus, only the Equity Takedown screen will be discussed in detail.

The Equity Takedown screen, shown in FIG. 8, allows the user to add, edit, or delete an equity takedown. The Select Shelf hyperlink links to the Select Deal screen passing it the argument to only look for Shelf deals, so that only Shelf deals appear for selection. This allows the takedown and shelf filings to be linked so that the system automatically subtracts the amount of the takedown from the original shelf, allowing a user to keep track of how much of the shelf is remaining for future capital issuance. Once a shelf is selected, it will populate the other information on that section. Underwriters are added by selecting the "Add Bank" link that brings up an "Add Bank" screen (not shown) to allow the user to add a bank and its role to the list. Specific checks against the data after it is entered is then performed. Any error messages may be in red at the top of the page, listing everything that is incorrect before the deal is saved or update in an Equity database like the one shown below in Table 4.

TABLE 4

Target DB name:
Number of columns: 31
Number of indexes: 0
Number of foreign keys: 1

| Columns | Data type | Allow NULLs | Value/Range |
|---|---|---|---|
| Deal | int | Not allowed | |
| Shelf | int | Not allowed | |
| IssuerID (FK) | int | Not allowed | |
| Link_1 | varchar(200) | Allowed | |
| Link_2 | varchar(200) | Allowed | |
| Link_3 | varchar(200) | Allowed | |
| Form | varchar(20) | Allowed | |
| Filing_Date | datetime | Allowed | |
| Shares_Registered | int | Allowed | |
| Shares_Issued | int | Allowed | |
| Shares_Secondary | int | Allowed | |
| Shares_Primary | int | Allowed | |
| Price | decimal(10, 3) | Allowed | |
| Security_Class | varchar(100) | Allowed | |
| Interest | decimal(10, 3) | Allowed | |
| Lock_Up | int | Allowed | |
| Note | varchar(1000) | Allowed | |
| Debt_Total | decimal(12, 3) | Allowed | |
| Shares_Outstanding | int | Allowed | |
| Shares_Outstanding_TD | int | Allowed | |
| Overallotment_Authorized | int | Allowed | |
| Overallotment_Price_Date | datetime | Allowed | |
| Overallotment_Shares_Issued | datetime | Allowed | |
| Gross_Spread_Share | decimal(12, 3) | Allowed | |
| Gross_Spread_Total | decimal(12, 3) | Allowed | |
| Proceeds_Share | decimal(12, 3) | Allowed | |
| Proceeds_Total | decimal(12, 3) | Allowed | |
| Proceeds_Use | varchar(1000) | Allowed | |
| LastTrade_Before_File | decimal(12, 3) | Allowed | |
| Price_Date | datetime | Allowed | |
| LastTrade_Before_Price | decimal(12, 3) | Allowed | |

| Foreign keys | Child | Parent |
|---|---|---|
| tbl_Issuer_tbl_EQUITY_FK1 | IssuerID | tbl_Issuer.IssuerID |

The information may then be saved, cancelled, or deleted. When the save button is selected, the data is updated for an existing deal and added for a new deal. When the delete button is selected, the deal number from the Equity database, as well as, rows in a "Deal Bank" database with that deal number are deleted.

The Convertible Takedown screen, shown in FIG. 9, allows the user to add, edit, or delete a convertible takedown, and the Fixed Income Takedown screen, shown in FIG. 10, allows the user to add, edit, or delete a fixed income takedown. When the save button is selected, the data is updated for an existing deal and added for a new deal. When the delete button is selected, the deal number is deleted from a Convertible and Fixed Income table, as well as, all rows in the Deal Bank database and a "Deal Selling Shareholder" database with that deal number.

In addition to adding, editing, and deleting shelf filings and takedowns, the system 10 allows a user to run queries on specific filings. This allows a user to analyze the data for specific filings. For example, a user may want to analyze the performance of a filing with respect to the market. The system 10 also allows a user to create reports for use by bankers and other individuals in the investment world.

A software and database system is described above. Various details of the invention may be changed without departing from its scope. Furthermore, the foregoing description of the preferred embodiments of the invention and best mode for practicing the invention are provided for the purpose of illustration only and not for the purpose of limitation.

I claim:

1. A computerized method of tracking investment registrations, comprising:
   accessing a first database containing data associated with investment registrations of entities, wherein the data is organized as a series of individual filings;
   for each of plurality of the entities that have shelf investment registrations:
      determining, by a computer, if a particular entity has filed a shelf filing or a shelf takedown;
      retrieving, by the computer, data from the first database associated with the shelf filing or shelf takedown of the particular entity to identify an amount of the shelf filing or an amount of the shelf takedown;
      determining if the filing of the particular entity is a shelf filing or a shelf takedown;
      in response to determining that the filing of the particular entity is a shelf filing, selecting the particular entity associated with that filing, wherein the particular entity comprises an issuer associated with the filing;
      in response to determining that the filing of the particular entity is a shelf takedown, determining, by a computer, a registration of the shelf takedown;
   tracking, using a computer, shelf investment registrations of the particular entity by organizing the retrieved data associated with the shelf filing or shelf takedown of the particular entity so that a computer performs at least one of summing the shelf filings and subtracting the shelf takedowns in order to determine a total shelf capacity of a particular entity; and storing the total shelf capacity in a second database so that a searcher can query the second database to determine the total shelf capacity of the entities.

2. The method according to claim 1, wherein the step of retrieving data includes the step of searching by a company ticker.

3. The method according to claim 1, wherein the step of retrieving data includes the step of searching by an issuer name.

4. The method according to claim 1, and further including the step of linking parent companies to their respective subordinate companies.

5. The method according to claim 1, and further including the step of tracking common stock associated with the filings.

6. The method according to claim 5, and further including the step of tracking a performance of the common stock.

7. The method according to claim 1, and further including the step of updating the data when a takedown relative to the filings has occurred.

8. The method according to claim 1, and further including the step of automatically updating the data.

9. The method according to claim 1, and further including the step of searching a data entry system for previously downloaded data relating to a respective shelf filing.

10. The method according to claim 1, and further including the step of updating the data by searching for market activity relating to the shelf filing and downloading the data into the data entry system.

11. The method according to claim 1, and further including the step of organizing the shelf takedowns by registration of each respective takedown.

12. A non-transitory computer readable medium having computer-executable instructions embedded therein for tracking investment registrations, the computer-executable instructions are configured for executing a method, the method comprising:

accessing a first database containing data associated with investment registrations of entities, wherein the data is organized as a series of individual filings;

for each of plurality of the entities that have shelf investment registrations:

determining, by a computer, if a particular entity has filed a shelf filing or a shelf takedown;

retrieving, by the computer, data from the first database associated with the shelf filing or shelf takedown of the particular entity so as to identify an amount of the shelf filing or an amount of the shelf takedown;

in response to determining that the filing of the particular entity is a shelf filing, selecting the particular entity associated with that filing, wherein the particular entity comprises an issuer associated with the filing;

in response to determining that the filing of the particular entity is a shelf takedown, determining the registration of the shelf takedown;

tracking shelf investment registrations of the particular entity by organizing the retrieved data associated with the shelf filing or shelf takedown of the particular entity so that a computer performs at least one of summing the shelf filings or subtracting the shelf takedowns of the particular entity in order to determine a shelf capacity of the particular entity; and storing at least one of the total shelf capacity or retrieved data in at least one table so that a searcher of the at least one table can query the at least one table to determine a real time shelf capacity of the entities.

13. The computer readable medium including software according to claim 12, and further including instructions for tracking performance of common stock associated with the filings.

14. The computer readable medium including software according to claim 12, and further including instructions for linking parent companies to their respective subordinate companies.

15. The computer readable medium including software according to claim 12, and further including instructions for tracking a takedown relative to the filings and subtracting the takedown from a corresponding linked filing.

16. The computer readable medium including software according to claim 15, and further including instructions for updating the data in response to the takedown.

17. The computer readable medium including software according to claim 12, and further including instructions for retrieving data associated with previously retrieved data relating to a respective one of the filings.

18. The computer readable medium including software according to claim 12, and further including instructions for monitoring market activity relating to the filings.

19. The computer readable medium including software according to claim 12, and further including instructions for generating a report in a format suitable for investment banking.

20. A system for determining shelf capacity of at least one entity, the system comprising a computer hardware processor;

a searchable database comprising shelf capacity information for entities that have shelf investment registrations, wherein the database comprises:

a plurality of entities where each of the plurality of entities have shelf investment registrations; and a shelf capacity amount that is periodically tracked and updated, whereby the determination is made for each entity what entities have competed a shelf filing or a shelf takedown, whereby the processor retrieves data from a registration database associated with the shelf filing or shelf takedown to identify an amount of the shelf filing or an amount of the shelf takedown, and whereby the processor updates, in the searchable database, the shelf investment registrations for each respective entity by summing the shelf filings or subtracting the shelf takedowns for each respective entity to determine a total shelf capacity thereof; and at least one module that, when executed by the processor, causes the processor to perform a method, the method comprising:

providing a graphical user interface to allow a user to enter search parameters relating to at least one of specific filings or for real time shelf capacities of at least one entity of the entities;

receiving the search parameters over a network;

querying the database with the search parameters; and providing a report of specific filings or real time shelf capacities of the at least one entity so that the user can obtain and analyze the shelf capacities of the at least one entity.

* * * * *